US012090447B2

(12) United States Patent
Flieg et al.

(10) Patent No.: US 12,090,447 B2
(45) Date of Patent: Sep. 17, 2024

(54) DOPED MEMBRANES

(71) Applicant: GAMBRO LUNDIA AB, Lund (SE)

(72) Inventors: Ralf Flieg, Rangendingen (DE); Markus Storr, Filderstadt (DE); Bernd Krause, Rangendingen (DE); Markus Hornung, Nehren (DE); Karl Heinz Klotz, Jungingen (DE)

(73) Assignee: GAMBRO LUNDIA AB, Lund (SE)

( * ) Notice: Subject to any disclaimer, the term of this patent is extended or adjusted under 35 U.S.C. 154(b) by 115 days.

(21) Appl. No.: 17/218,523

(22) Filed: Mar. 31, 2021

(65) Prior Publication Data

US 2021/0229047 A1 Jul. 29, 2021

Related U.S. Application Data

(63) Continuation of application No. 14/364,755, filed as application No. PCT/EP2012/074899 on Dec. 10, 2012, now abandoned.

(30) Foreign Application Priority Data

Dec. 15, 2011 (EP) .................................... 11193795

(51) Int. Cl.
*B01D 69/14* (2006.01)
*B01D 67/00* (2006.01)
*B01D 69/06* (2006.01)
*B01D 69/08* (2006.01)

(52) U.S. Cl.
CPC ........ *B01D 69/148* (2013.01); *B01D 67/0011* (2013.01); *B01D 69/06* (2013.01); *B01D 69/08* (2013.01); *B01D 69/087* (2013.01); *B01D 69/088* (2013.01); *B01D 69/141* (2013.01); *B01D 69/147* (2013.01); *B01D 2325/36* (2013.01); *B01D 2325/38* (2013.01); *B01D 2325/42* (2013.01)

(58) Field of Classification Search
None
See application file for complete search history.

(56) References Cited

U.S. PATENT DOCUMENTS

| 4,851,100 A * | 7/1989 | Hodgdon | C08J 5/2275 427/245 |
| 4,970,034 A * | 11/1990 | Ly | B01D 71/68 264/561 |
| 5,151,227 A * | 9/1992 | Nguyen | B01D 71/68 264/180 |
| 5,762,798 A * | 6/1998 | Wenthold | B01D 69/08 96/10 |
| 6,780,327 B1 * | 8/2004 | Wu | B01D 69/10 210/488 |

(Continued)

*Primary Examiner* — Jonathan M Peo
(74) *Attorney, Agent, or Firm* — Barnes & Thornburg LLP

(57) ABSTRACT

Synthetic membranes for the removal, isolation, or purification of substances from a liquid. The membranes include at least one hydrophobic polymer and at least one hydrophilic polymer. 5-40 wt.-% of particles having an average particles size of between 0.1 and 15 μm are entrapped. The membrane has a wall thickness of below 150 μm. Methods for preparing the membranes in various geometries, and use of the membranes for the adsorption, isolation, and/or purification of substances from a liquid are explored.

18 Claims, 7 Drawing Sheets

(56) References Cited

U.S. PATENT DOCUMENTS

| | | | |
|---|---|---|---|
| 2003/0196960 A1* | 10/2003 | Hughes | C02F 9/005 210/681 |
| 2006/0099414 A1* | 5/2006 | Koops | C12N 11/082 428/364 |
| 2007/0185264 A1* | 8/2007 | Seo | B01D 67/002 525/88 |
| 2009/0283470 A1* | 11/2009 | Krause | B01D 69/081 264/48 |
| 2010/0294714 A1* | 11/2010 | Buck | B01D 71/68 210/500.23 |

* cited by examiner

A

B

A

B

DOPED MEMBRANES

CROSS-REFERENCE TO RELATED APPLICATIONS

This application is a continuation application of U.S. application Ser. No. 14/364,755 filed Jun. 12, 2014, which is the U.S. national phase application of PCT/EP2012/074899 filed Dec. 10, 2012. PCT/EP2012/074899 claims the benefit under the Paris Convention of the Dec. 15, 2011 filing date of EP 11193795.9. The disclosures of U.S. Ser. No. 14/364,755, EP 11193795.9, and PCT/EP2012/074899 are hereby incorporated herein in their entireties by reference.

TECHNICAL FIELD

The present disclosure relates to synthetic membranes for the removal, isolation or purification of substances from a liquid, comprising at least one hydrophobic and at least one hydrophilic polymer, wherein 5-40 wt.-% of particles having an average particles size of between 0.1 and 15 μm are entrapped in the membrane and wherein the membrane has a wall thickness of below 150 μm. Further disclosed are methods for preparing such membranes in various geometries and their use for the adsorption, isolation and/or purification of substances from a liquid.

DESCRIPTION OF THE RELATED ART

Synthetic membranes with entrapped particles or ionic charges have been described before in the prior art.

WO 2004/003268 A1 describes the basic approach for the preparation of porous polymeric fibers comprising a broad variety of functionalized or active particles, wherein a solution of one or more polymers is mixed with particulate material and wherein the mixture is extruded into a fiber by a two-step inversion process. WO 2004/003268 A1 also describes that porous polystyrene or styrene-divinylbenzene type particles, either unmodified or modified with sulphonic acids or quaternary amines may possibly be used as particulate material. However, WO 2004/003268 A1 does not teach how stable porous or non-porous membranes can be prepared which contain ion exchange particles in amount of about 5-40 wt.-%, wherein the particles have a very small average diameter. Whereas the reference teaches that it may be beneficial to have small particles, below 15 μm, entrapped in the membrane, it is taught that particle load should be higher. In the examples, all membranes have a particle load of 50 wt.-% or higher. Such high load of particles of above 50% wt.-% is said to be preferred for improving the accessibility of the particles and for obtaining a stable membrane structure under avoidance of the formation of macrovoids (Example 6 and FIGS. 7 and 8).

It is a problem, when preparing membranes with entrapped particles, to obtain stable membranes, especially hollow fiber membranes. In the processes as described in the prior art, hollow fiber membranes tend to get unstable due to the formation of macrovoids and varying wall thicknesses. The spinning is generally difficult and the process is often interrupted because the fibers get torn at the spinning nozzle during spinning. Therefore, fibers as can be seen in the prior art are generally solid fibers or hollow fibers with higher wall thickness of about 250 μm.

The applicants have found that it is possible to prepare membranes, especially also hollow fiber membranes with a wall thickness of below 150 μm with a considerably lower particle load of below 40 wt.-%, wherein both the physical stability and efficiency of the membrane is improved in comparison to membranes with higher particle load and/or particles with an average diameter of above about 20 μm. This is achieved by an improved process for preparing a membrane with entrapped particles, comprising an improved generation and maintenance of particles with an average size of about 0.1 to 15 μm and an improved process for generating a spinning solution comprising said particles, resulting in a stable spinning process and stable membranes.

WO 2006/019293 A1 relates to hollow or solid fiber membranes having multiple porous layers which are concentrically arranged, and wherein at least one of the layers comprises functionalized or active particles as described in WO 2004/003268 A1 above. The layer containing high loads of particles can be either the outer or the inner layer, wherein the function of the other layer, without particles, is to provide mechanical stability to the fiber. As described before, WO 2006/019293 A1 does not disclose ways to obtain stable membranes with low particle load which can be prepared as hollow fiber membranes without adjacent stabilizing layers.

EP 1 038 570 A1 describes the preparation of positively charged membranes including a sulfone polymer and PVP and a cationic imidazolinium compound. However, the cationic material is not present in the membrane in form of particulate material.

The applicants have found methods to produce and provide mechanically stable membranes which can be produced as solid, hollow fiber or flat sheet membranes and which have specifically and stably entrapped therein particles such as ion exchange particles in an amount of preferably 5-40 wt. %, wherein the average particle size is below 15 μm and generally in the range of between 0.1 and 10 μm, especially in the range of from 0.1 to 1.0 μm. The applicants further found that based on the process for preparing the new membranes and the resulting nature of such membranes of the invention, the comparatively low particle load of the membrane is highly effective for adsorbing, isolating and/or removing certain compounds from liquids, such as, for example, nucleic acids, toxins, such as endotoxins, unconjugated bilirubin, diazepam, and also problematic endogenous substances such as cytokines or the like.

SUMMARY

It is an object of the present invention to provide more efficient and mechanically more stable synthetic membranes which can be used for the adsorption, purification or isolation of compounds from a liquid. One object of the present invention was to provide membranes in a hollow fiber geometry with a wall thickness which is smaller compared to the prior art, thus providing better accessibility and higher efficiency of the membrane when used.

It was found, surprisingly, that very efficient and mechanically stable doped membranes may be prepared wherein the membrane has entrapped therein particles which are very small. The membrane is further characterized by a low particle load. At the same time the wall thickness of the membranes is considerably lower than in the art. It was found that such membranes should have entrapped therein particles with an average size (diameter) of between 0.1 and 1.0 μm, and not essentially more than 15 μm, even though relatively good membranes can be obtained with 20 μm particles as well. Further, a particle load of up to 50%, generally of between 5 and 40 wt.-%, may be achieved.

Accordingly, it was a further aspect of the present invention to devise a process for preparing such membranes. It was one object of the invention to provide a process which allows the preparation of particles with an average size of well below 15 μm, wherein the new process should also prevent the agglomeration of the particles once they are added to the spinning solution and during the spinning process.

It was also an object of the present invention to provide a doped membrane such as a hollow fiber membrane with increased effectiveness of the membrane when used in methods for removing a specific target substance from a liquid.

The membranes with such small size particles and low particle load show an improved activity or efficiency with regard to the removal or adsorption of the respective target substances from a liquid compared to membranes having a higher particle load and/or larger particles and higher wall thickness.

BRIEF DESCRIPTION OF THE DRAWINGS

FIG. 1A shows the complete cross-section (200×) of the membrane, whereas FIG. 1B shows the magnification (1000×) of the cross-section of FIG. 1A. The entrapped basic anion exchange particles (cholestyraminee (DOWEX™ 1×2-Cl)) in which quaternary ammonium groups are attached to a styrene/divinylbenzene copolymer chain are not visible in the membrane at a magnifications of 200. It is possible, at a magnification of 1000 (see also FIG. 2A), to discern tiny particles which are completely entrapped in the membrane. It can be seen that the particles' average size is well below about 5 μm (see also FIG. 2).

FIG. 2A shows the inner or lumen side of the membrane at a magnification of 2.500. FIG. 2B shows the outer surface of the hollow fiber membrane at the same magnification.

FIG. 3B shows the wall of the membrane at a magnification of 1000. The membrane was prepared according to Comparative Examples 2, 2.2 and 3 (Batch C), wherein the anion exchange particles (DOWEX™ 1×2-Cl) were grinded in NMP in the absence of water to about the same initial size as in Example 2.1 (see also FIGS. 1 and 2). As can be seen, the particles as present in the final membrane are larger as in FIG. 1, even though it should be noted that the SEM shows a dry membrane wherein the particles have undergone some shrinking. They are present in distinct cavities within the membrane and eventually break through the surface of the membrane, thus increasing the risk of particles being washed out into the adjacent liquid. Without wanting to be limited to the theory, it is assumed that the cavities are formed by the water which is taken up by the particles and serves as a precipitating agent around said particles. During use of the membrane, the membrane will usually be contacted again with water or an aqueous solution, which will lead to the renewed swelling of the particles. The actual average diameter of the particles during use is thus larger than the average diameter displayed in the SEM.

DETAILED DESCRIPTION

Figure 1:
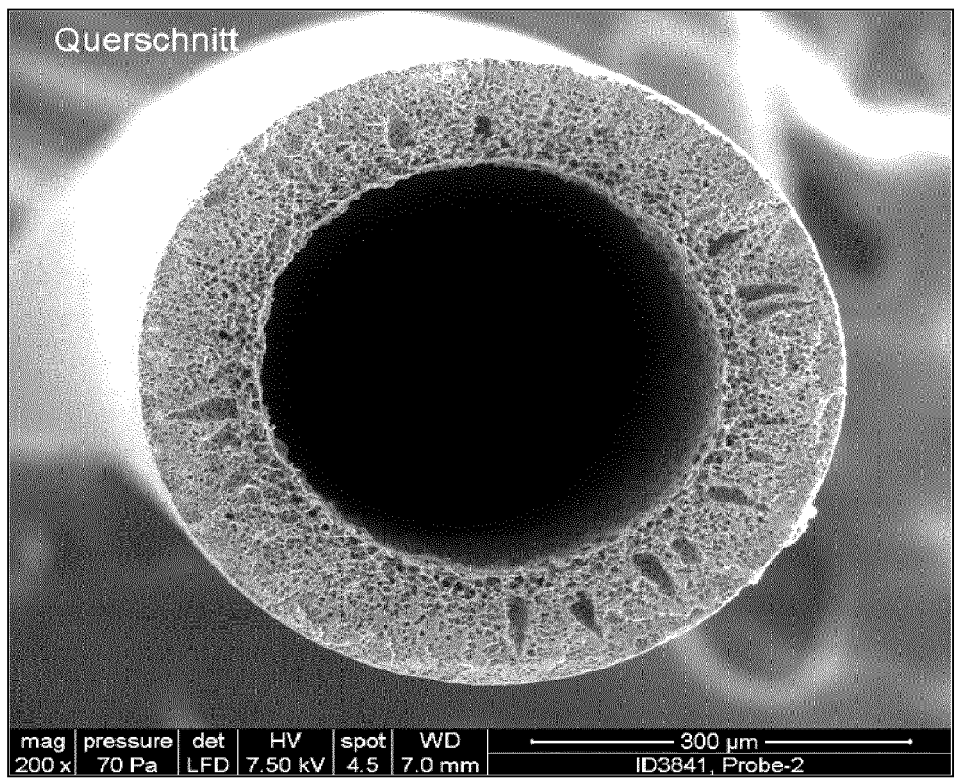
FIG. 1 shows a SEM of a microporous hollow fiber membrane according to Examples 2.1 and 3 which is based on polyethersulfone and PVP and wherein the particles were grinded in the presence of NMP and water.
Figure 1:
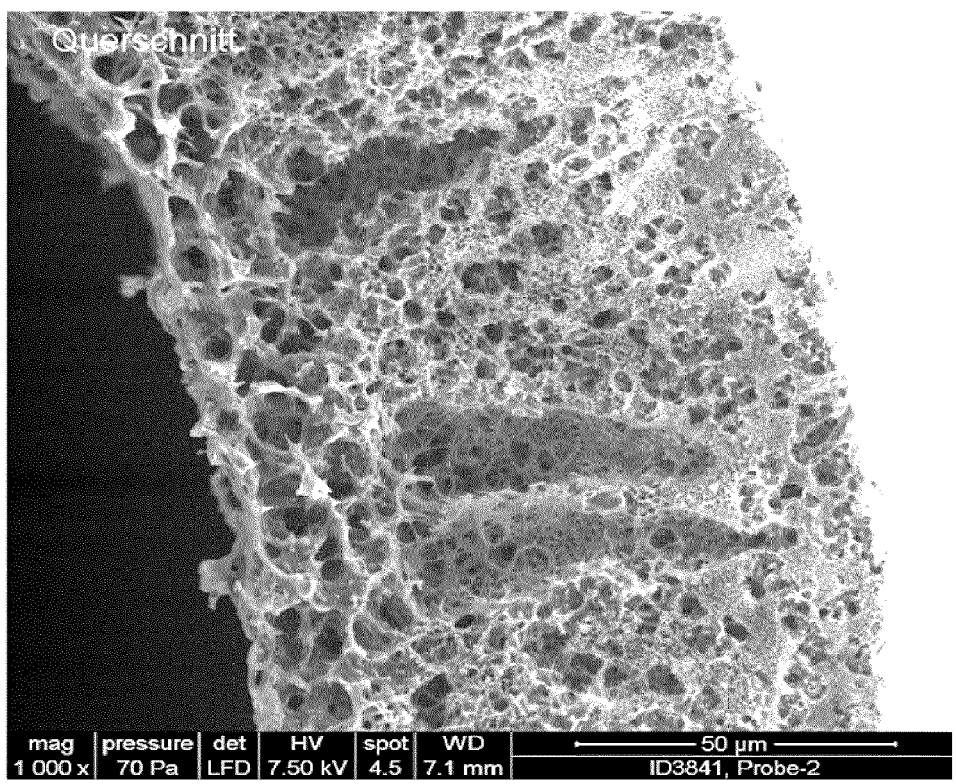
Figure 2:
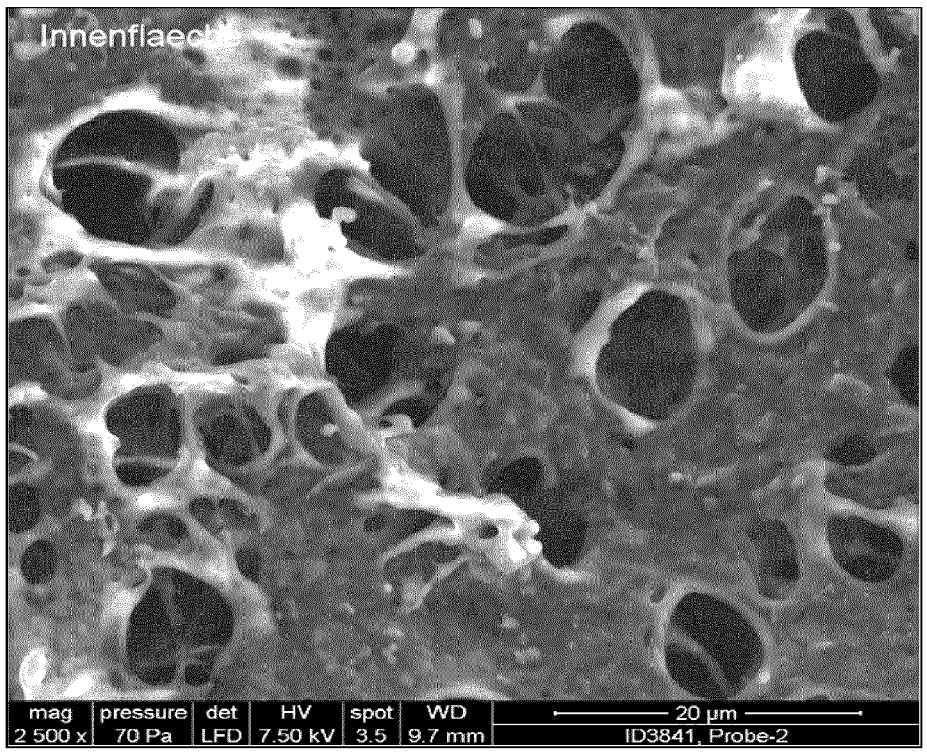
FIG. 2 shows a SEM of the inner and outer surface of the microporous hollow fiber membrane. The SEM have been taken from the same membrane as the SEM of FIG. 1.
Figure 2:
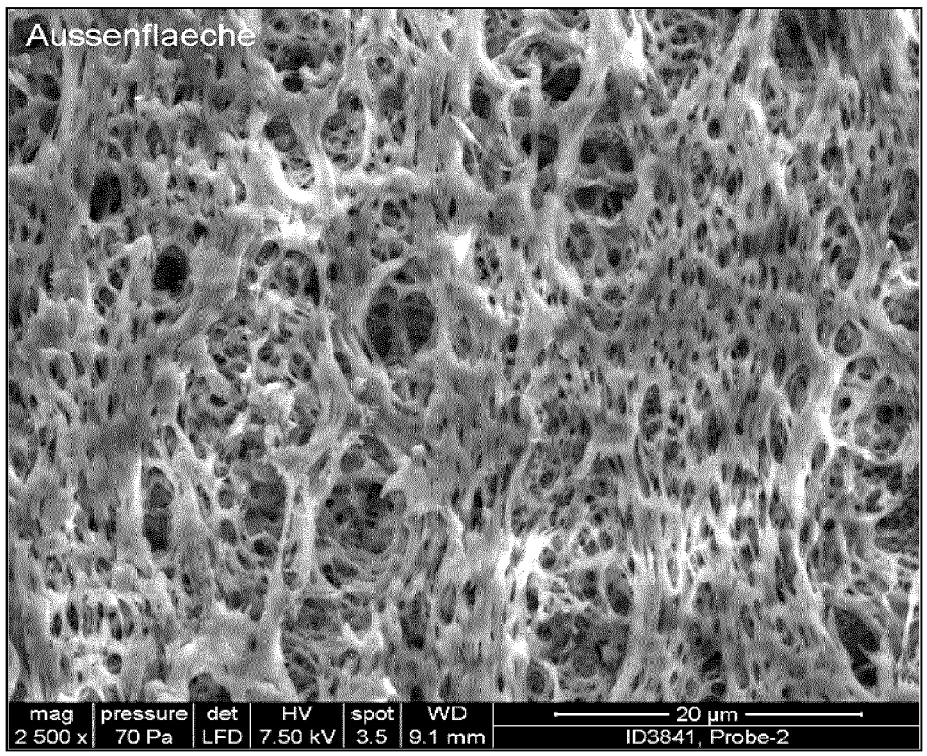

The present invention is directed to more efficient and mechanically stable synthetic membranes which can be used for the adsorption, purification or isolation of compounds from a liquid, wherein the membranes have entrapped therein particles which can be chosen according to the needs of the adsorption, purification or isolation task.

The expression "doped membrane" as used herein refers to the inclusion of particles (which might also be referred to as "impurities") into a membrane during its formation for the purpose of modulating its properties.

The expression "particles" as used herein, refers to solid or gel-like fragments of certain solid or gel-type materials, such as hydrophobic materials or ion exchange materials. The expression "gel" or "gel-type" as used herein, refers to materials or resins with no permanent pore structures. Said pores are generally considered to be small and, in general, not greater than 30 Å, and are referred to as gelular pores or molecular pores. The pore structures are determined by the distance between the polymer chains and cross-links which vary with the crosslink level of the polymer, the polarity of the solvent and the operating conditions. The gel type resins are generally translucent. The fragments or particles may have different shapes, such as approximately spherical shapes or irregular, edged shapes which may be stretched or cubical. The particles as discussed in the context of the present invention have an average size (diameter) of from 0.1 to about 100 µm.

The expression "ion exchange material" as used herein, refers an insoluble polymeric matrix containing labile ions capable of exchanging with ions in the surrounding medium. Generally, ion exchange resins are supplied water wet in the form of approximately spherical beads having a particle diameter between 0.30 and 1.2 mm. A given resin has a characteristic water content associated with the functional groups and adhering to the outer surface of the resin particles. Notably, water wet ion exchange resins shrink or swell when they change from one ionic form to another and they shrink when they are dried and/or are in contact with non-polar solvents.

It is one aspect of the present invention that the membranes according to the invention can be provided in various geometries, covering flat sheet and solid fibers as well as hollow fibers. It is a specific aspect of the present invention that hollow fiber membranes can be prepared which have a wall thickness which is smaller compared to the prior art, thus providing better accessibility and higher efficiency of the membrane when used.

It is a problem, when preparing membranes with entrapped particles according to the prior art to obtain stable membranes, especially hollow fiber membranes. In the processes as described in the prior art, hollow fiber membranes tend to get unstable due to the formation of macrovoids and varying wall thicknesses. The spinning is generally difficult and the process is often interrupted because the fibers get torn at the spinning nozzle during spinning. Therefore, fibers as can be seen in the prior art are generally solid fibers or hollow fibers with higher wall thickness of about 250 µm. Accordingly, in one aspect of the present invention, the membranes, either hollow fiber or flat sheet membranes, have a wall thickness of below 150 µm. According to a specific aspect of the present invention, the wall thickness is between 100 and 150 µm.

According to another aspect of the present invention, it is crucial for obtaining such membranes wherein both the physical stability of the membrane is improved in comparison to membranes of the prior art and the wall thickness is reduced, to prepare membranes with a lower particle load of below 40 wt.-%. According to a specific aspect of the present invention, the particle load should be in the range of between 5 wt.-% and 40 wt.-% relative to the total weight of the membrane. In yet another aspect of the present invention, the particle load should be in a range of from 20 wt.-% and 35 wt.-% of the total weight of the membrane.

At the same time, it is important to closely control the average size of the particles and their behaviour in the spinning solution. Particle size data, as used herein, refer to the particles in a wet state both as such and when incorporated in a membrane. It was found that particles with an average diameter of more than 15 or 20 µm are problematic for obtaining useful membranes. The same is true for smaller particles of below said 15 to 20 µm, which may be as small as between 1 µm and 0.1 µm in diameter at the time of grinding, if the process of grinding and preparing a spinning solution as well as the spinning itself are not controlled in a way that the particles stay apart from each other and will not agglomerate immediately upon grinding and especially during formation of the spinning solution and the spinning itself. Accordingly, it is one aspect of the present invention to provide a membrane wherein the entrapped particles have an average diameter of below 20 µm, preferably below 15 µm. According to one aspect of the present invention, the entrapped particles should have an average diameter of below 10 µm. According to one aspect of the present invention, the average diameter of the entrapped particles should be below 15 µm. According to another aspect of the present invention, the average diameter of the entrapped particles should be in a range of from 0.1 µm to 10 µm.

The particles which can be entrapped in a membrane according to the invention and the processes disclosed herein may be of various nature, such as also disclosed in the prior art (WO 2004/003268 A1, incorporated herein by reference). According to one aspect of the present invention, the particles are ion exchange particles which are prepared from ion exchange material widely known in the art which is also commercially available. According to one specific aspect of the present invention, cation or anion exchange material can be used for preparing the doped membranes of the invention. According to another aspect of the present invention, the particles are hydrophobic particles chosen from the group consisting of activated carbon, carbon nanotubes, hydrophobic silica, styrenic polymers, polydivinylbenzene polymers and styrene-divinylbenzene copolymers.

According to one aspect of the invention, basic anion exchange material is used for preparing the doped membranes, which may be based on polystyrene or styrene-divinylbenzene and which may be modified with sulphonic acids, polyamines or quaternary or tertiary amines. According to one aspect of the invention, the particles are based on a copolymer of styrene and divinylbenzene carrying active groups such as quaternary ammonium groups, dimethylethanolamine groups, dimethylethanolbenzyl ammonium groups, benzyltrialkyl ammonium groups, benzyldimethyl (2-hydroxyethyl) ammonium and/or trimethylbenzyl ammonium functional groups. According to a specific aspect of the present invention, the particles used are based on a copolymer of styrene and divinylbenzene carrying quaternary ammonium groups. According to one aspect of the invention, the copolymer of styrene and divinylbenzene carries trimethylbenzyl ammonium functional groups, which is also referred to as cholestyramine, Cuemid, MK-135, Cholbar, Cholbar, Questran, Quantalan, Colestyramine or Dowex® 1×2-Cl and as cholestyramine from Purolite®. According to another aspect of the present invention the anion exchange material is used in the chloride form.

Anion exchange media which can also be used are known, for example, under the trade name Amberlite®. Amberlite® comprises, for example, a matrix formed of styrene-divinylbenzene having active or functional groups such as quaternary ammonium groups, bezyldimethyl (2-hydroxyethyl) ammonium groups or dimethylethanolamine groups. Other anion exchange media which can be used are known for example, under the trade name Dowex®. Dowex® comprises, for example, a matrix formed of styrene-divinylbenzene which may have active or functional groups such as trimethylbenzylammonium.

In yet another aspect of the present invention, the particles entrapped in the membrane of the invention are based on vinylimidazolium methochloride vinylpyrrolidone copolymers, known, for example, as Luviquat®.

According to yet another aspect of the present invention, the particles may be uncharged, hydrophobic particles, such as styrenic polymers like DOWEX™ OPTIPORE™ L493 and V493 or Amberlite® XAD®-2, polydivinylbenzene polymers or styrene-divinylbenzene copolymers (e.g. Amberlite® XAD4 or Amberchrom™ CG161), poly(1-phenylethene-1,2-diyl) (Thermocole), or hydrophobic silica, which is silica that has hydrophobic groups chemically bonded to the surface, or combinations thereof. Hydrophobic silica can be made both from fumed and precipitated silica. Hydrophobic silica can be made both from fumed and precipitated silica. Hydrophobic groups that can be used are, for example, alkyl or polydimethylsiloxane chains. Another hydrophobic material which can be used is known as Ujotit, a copolymer of styrene and divinylbenzene without any functional groups, which is available as Ujotit PA-30, Ujotit PA-40 or Ujotit PA-20. Activated carbon particles which may be used according to the invention can be derived, for example, from carbon such as Printex® XE2 (Degussa AG) or Norit® GAC 1240 PLUS A (Norit Nederland BV).

Cation exchange particles which may be used are generally based on matrices of agarose, cellulose, dextran, methacrylate, polystyrene or are polyacrylic acid. They are generally known and commercially available, for example, under trade names such as Sepharose® CM, Sephadex, Toyopearl®, Amberlite®, Diaion™, Purolite®, Dowex® and Duolite® SO$_3$H, respectively.

In order to obtain the doped membranes of the present invention, it is important to provide a method of grinding which allows the preparation of particles with an average particle size of below 20 μm or below 15 μm, e.g. of between 0.1 and 10 μm, wherein the particles will not re-form or agglomerate into larger particles during or after grinding and during the formation of the spinning solution and/or the spinning process itself. In other words, the method of grinding and subsequent formation of a spinning solution must ensure the maintenance of particles with said average size of about 0.1 to 15 μm.

Figure 3:
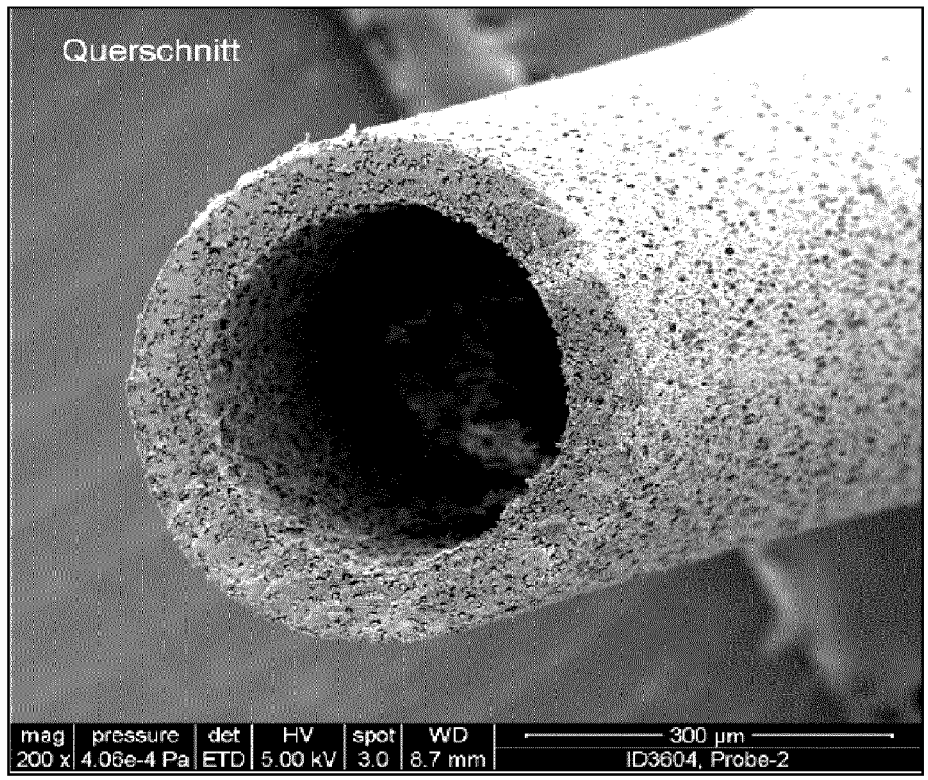
FIG. 3 shows a SEM of the cross-section of a hollow fiber membrane with a magnification of 200 (FIG. 3A).
Figure 3:
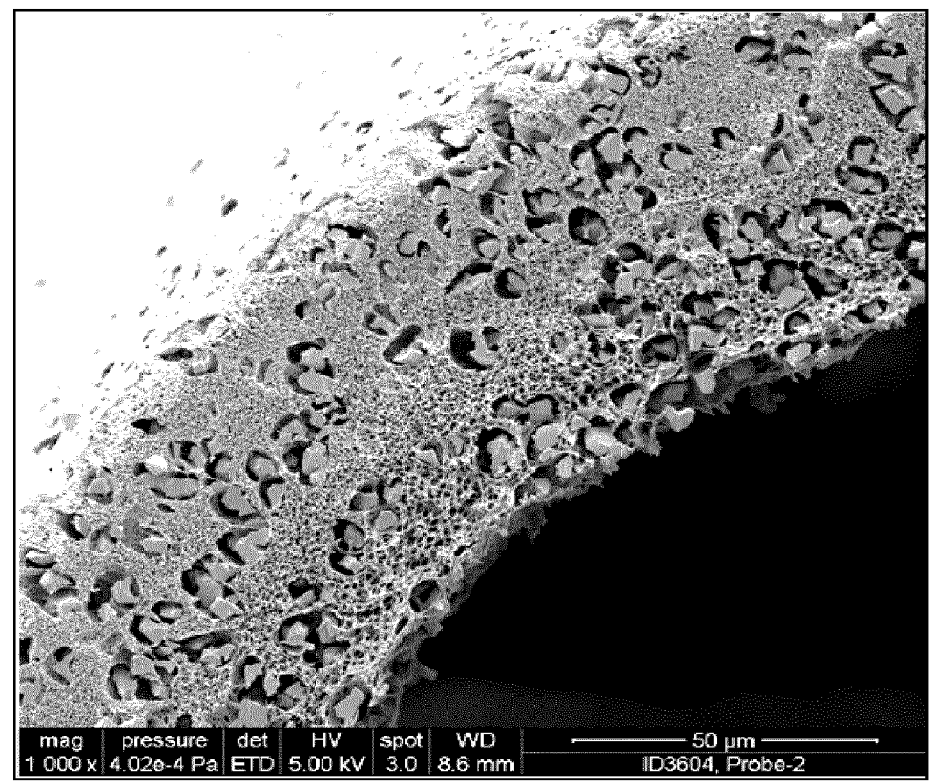

According to one aspect of the present invention, the particles used are based on gel ion exchange material (gel resins). For example, Dowex® 1×2-Cl is provided as a gel with a particle size of between 100 and 200 mesh. The general particle size of, for example, the before-mentioned anion exchange material is in the range of 20 to 400 mesh (μm) depending on the specific starting material. Most ion exchange materials such as anion exchange material are provided as gels. Gel resins generally have higher ion capacity compared to e.g. microporous resins. Such ion exchange resins are hygroscopic, wherein the amount of moisture hydrated by the material depends on the cross-linking and the type of functional group. Low cross-linking gel resins with functional groups such as quaternary ammonium contain large amounts of water resulting in swelling. The addition and removal of water thus results in swelling and contraction. The hygroscopic and swelling properties of the material severely influence the grinding process and especially the formation of the spinning solution and the following spinning process. Tests could show that the dry grinding of the ion exchange material which was done in the absence of additional water resulted in fine particles in the desired range of about 1 to 7 μm. However, the particles swelled upon addition to a standard polymer solution comprising, among other components, water. In addition, the particles were shown to agglomerate, especially upon adding the particles to spinning solutions which contain water. The particles finally present in the polymer solution were found to have a size of again up to 20-30 μm and were deposited in such size in the membrane during spinning (see Examples 1, 2.2, 3 and 6), even if the addition of the particles to the spinning solution or vice versa was done very slowly. As a consequence, the spinning of the membranes is difficult and often is interrupted as the nozzles get clogged by the larger particles, in which case the spinning is interrupted and the fiber is torn. In the resulting membranes, the particles are well visible within a cavity or void formed by the water which is abundant in the particle, as can be seen in the SEM as shown in FIG. 3. Furthermore, the large particles being close to or penetrating the outer or inner surface of the membrane destabilize the membrane and are prone to be washed out of the membrane structure. The efficacy and usefulness of such membranes for removing or adsorbing the targeted substances from a liquid is thus limited.

It could now be shown that it is important for avoiding such problems to perform the grinding of the particles in an aqueous solution or in a solution comprising water and an organic solvent. The organic solvent usually will be the organic solvent also used for forming the spinning solution. As a result, a suspension comprising particles, water and, optionally, organic solvent, is formed. The amount of water used for forming the suspension may vary.

According to one aspect of the present invention, water should be added in an amount which corresponds to the amount of water which is needed for forming the spinning solution. In other words, the complete amount of water which would otherwise be a component of the spinning solution is already added to the ion exchange material for grinding. Any influence of water which is added at a later stage, for example during the formation of the final spinning solution, is thus avoided. However, it is also possible to add only a portion of the complete amount of water to the grinding process, as long as the amount of water sustains the forming and maintenance of the particles of the intended size according to the invention and avoids further swelling and/or agglomeration of the particles. According to another aspect of the invention, the water is supplemented by an organic solvent, wherein the solvent is chosen according to the organic solvent which is otherwise used for forming the membrane spinning solution. Such organic solvent can be chosen from the group comprising, for example, N-alkyl-2-pyrrolidones (NAP) such as N-methyl-2-pyrrolidone (NMP), N-ethyl-2-pyrrolidone (NEP), N-octyl-2-pyrrolidone (NOP); dimethyl acetamid (DMAc); dimethylformamide (DMF); dimethylsulfoxide (DMSO); formamide; THF; butyrolactone; especially 4-butyrolactone; and ε-caprolactam or mixtures thereof. However, any other organic solvent may be used in the process which is also used as an organic solvent for the preparation of synthetic membranes. Such organic solvents are generally known in the art. According to one aspect of the present invention, a mixture of water and NMP is used for grinding the ion exchange material.

According to another aspect of the invention, polyvinylpyrrolidone (PVP) can be added to the grinding solution in addition to the water and the optional organic solvent. The PVP concentration may vary. In general, the PVP concentration will be determined by the composition of the final polymer spinning solution. Particles for doped membranes based on polymer compositions which comprise PVP can thus be grinded in a solution which may include PVP in a concentration of up to the total amount of PVP which will be added to the polymer spinning solution. For example, a membrane without particles may consist of 80-99% by weight of a hydrophobic polymer, such as polyethersulfone, and 1-20% by weight of a hydrophilic polymer, such as polyvinylpyrrolidone. The PVP consists of a high (≥100 kD) and low (<100 kD) molecular component, wherein the PVP consists of 10-45 weight-%, based on the total weight of PVP in the membrane, of a high molecular weight component, and of 55-90 weight-%, based on the total weight of PVP in the membrane, of a low molecular weight component. The spinning solution for preparing a membrane according to the present invention comprises, for example, between 12 and 19 weight-% of a hydrophobic polymer and 5 to 12 weight-% of PVP, wherein said PVP consists of a low and a high molecular PVP component. Examples for high and low molecular weight PVP are, for example, PVP K85/K90 and PVP K30, respectively. PVP was found to stabilize the grinding suspension and foster the maintenance of the particles at the desired size.

It is another aspect of the present invention that the grinding time can be significantly reduced by such grinding process. In addition, the energy expenditure is also significantly reduced as, surprisingly, the softer material proved to be grinded more readily in a process according to the invention. Usually, brittle or recalcitrant material is better suited for grinding.

Various grinding mills can be used for a grinding process according to the invention. Such mills should be able to control pressure, temperature and energy input. Agitator bead mills are commercially available, for example, from manufacturers such as Nitzsch, Hosokawa Alpine or WAB. For example, the LABSTAR mills of Nitzsch, which are generally used for laboratory scale applications, can be used in accordance with the present invention. The achieved process data for the specific grinded material can then be used for a scale up and may be applied for production machines available from the same producer.

According to one aspect of the present invention, the membrane may effectively be used for removing or purifying from a liquid substances which bind to or are adsorbed to the material which is entrapped in the membrane according to the invention. According to one aspect, the membranes of the invention are used for the removal or purification of nucleic acids from a liquid. According to another aspect, the membranes of the invention are used for the removal or purification of certain target substances, comprising endogenous and/or exogenous toxins, from a liquid. Such liquid may comprise, for example, whole blood, blood products such as, for example, blood fractions like blood plasma, cell culture suspensions or their supernatant and/or any fractions thereof, and solutions based on water, organic solvents or mixtures thereof and from which one or more compounds are to be removed or purified from and which will bind or adsorb to the hydrophobic or hydrophilic material, such as ion exchange or activated carbon particles, with which the membrane has been doped. The material to be entrapped in the membrane will have to be chosen according to the target compounds which shall be removed or purified from the liquid in question.

The membranes of the invention may be prepared and used in various geometries, such as, for example in hollow fiber geometry. The membranes may also be prepared as flat sheet membranes. It is also possible to prepare solid membranes.

According to one aspect of the invention, the wall thickness of the hollow fiber membrane is below 150 µm. In another aspect of the invention, the inner diameter of a solid or hollow fiber membrane is below 400 µm, generally between 250 µm and 400 µm.

According to another aspect of the invention, the membrane is used for the removal, adsorption, isolation and/purification of certain compounds from blood or blood products, such as, for example, blood plasma. According to yet another aspect of the invention, the membrane is used for the removal, adsorption, isolation and/purification of certain compounds from aqueous solutions, such as, for example, water or dialysate.

According to one aspect of the invention, the membranes are characterized in that they have particles entrapped therein, wherein the particles may consist of activated carbon particles and/or hydrophobic particles based on styrene-divinylbenzene copolymers and/or ion exchange material, such as cation exchange material or anion exchange material, for example anion exchange material based on polyquaternary ammonium functionalized styrene divinylbenzene copolymers.

According to another aspect, the invention relates to membranes which are characterized in that they have particles entrapped therein, wherein the particles consist of basic anion exchange material based on polyquaternary ammonium functionalized vinylimidazolium methochloride vinylpyrrolidone copolymers, such as, for example, Luviquat®.

According to a further aspect of the present invention, the polyquaternary ammonium functionalized styrene divinylbenzene copolymers and vinylimidazolium methochloride vinylpyrrolidone copolymers are functionalized with at least one quaternary ammonium selected from the group consisting of dimethyl(2-hydroxyethyl) ammonium, trimethylbenzyl ammonium, dimethylethanolbenzyl ammonium, dimethylethanol ammonium and benzyltriethyl ammonium. According to yet another aspect of the present invention, the functionalized polyquaternary ammonium copolymer is used in its chloride form for preparing and providing the membrane of the invention.

According to another aspect of the present invention the particles make up for 5-40 wt.-% of the total membrane mass. According to yet another aspect of the present invention, the particles are present in an amount of between 20 to 35 wt.-% of the total membrane.

According to another aspect of the present invention, the particles have an average size of below 15 µm in diameter. According to yet another aspect of the present invention, the particles have an average size of between 0.1 and 10 µm in diameter. According to yet another aspect of the present invention, the particles have an average size of between 0.1 and 1.0 µm in diameter.

According to a further aspect of the present invention, the membrane is otherwise comprised of at least one hydrophobic polymer selected from the group consisting of polysulfones, polyethersulfones, polyamides and polyacrylonitriles and at least one hydrophilic polymer. According to yet another aspect of the present invention, the hydrophilic polymer is selected from the group consisting of polyvinylpyrrolidone (PVP), polyethylene glycol (PEG), polyglycolmonoester, water soluble cellulosic derivates, polysorbate and polyethylene-polypropylene oxide copolymers. The particle content in the polymer spinning solution may vary. According to one aspect, the particle content is from about 0.1 to 12 wt.-% of the spinning solution. According to another aspect, the particle content in the spinning solution is from 1 to 10 wt.-% of the spinning solution. According to yet another aspect of the invention, the particle content is from 1 to 8 wt.-% of the spinning solution.

According to one aspect of the present invention, the doped membranes of the invention are microporous membranes. Microporous membranes are known in the art and can be prepared, for example, according to what is disclosed in EP 1 875 957 A1, incorporated herein by reference. The expression "microporous" as used herein refers to membranes which are characterized by an average pore diameter of the selective separation layer in the membrane in the range of 0.1 to 10 µm, preferably 0.1 to 1.0 µm.

According to one aspect of the present invention, doped microporous hollow fibre membranes can be prepared in a process comprising the steps of extruding a polymer solution through the outer ring slit of a hollow fibre spinning nozzle, simultaneously extruding a centre fluid through the inner bore of the hollow fibre spinning nozzle, into a precipitation bath, whereby the polymer solution contains 0.1 to 10 wt.-% of hydrophobic and/or ion exchange particles, 10 to 26 wt-% of a hydrophobic polymer, such as polysulfone (PSU), polyethersulfone (PES) or polyarylethersulfone (PAES), 8 to 15 wt-% polyvinylpyrrolidone (PVP), 55 to 75 wt-% of a solvent such as, for example, NMP, and 3 to 9 wt % water. The centre fluid contains 70 to 90 wt-% of a solvent such as, for example, NMP, and 10 to 30 wt-% water, and the precipitation bath contains 0 to 20 wt-% of a solvent such as, for example, NMP, and 80 to 100 wt-% water.

According to another aspect of the present invention, the doped membranes of the invention are ultrafiltration membranes. Membranes of this type can be characterized by a pore size, on the selective layer, of from about 2 to 6 nm as determined from dextran sieving experiments. The preparation of ultrafiltration membranes is known in the art and are described in detail, for example, in U.S. Pat. Nos. 4,935,141, 5,891,338 and EP 1 578 521 A1, all of which are incorporated herein by reference. According to one aspect of the invention, doped ultrafiltration membranes according to the invention are prepared from a polymer mixture comprising particles and hydrophobic and hydrophilic polymers in amounts such that the fraction of hydrophobic polymer in the polymer solution used to prepare the membrane is from 5 to 20% by weight and the fraction of the hydrophilic polymer is from 2 to 13% by weight.

According to another aspect of the present invention, the polymer solution for preparing a membrane according to the invention comprises from 0.1-8 wt.-% of ion exchange and/or hydrophobic particles, 11 to 19 wt.-% of a first polymer selected from the group consisting of polysulfone (PS), polyethersulfone (PES) and polyarylethersulfone (PAES), from 0.5 to 13 wt.-% of a second polymer such as polyvinylpyrrolidone (PVP), from 0 wt.-% to 5 wt.-%, preferably from 0.001 to 5 wt.-% of a polyamide (PA), from 0 to 7 wt. % of water and, the balance to 100 wt.-%, of a solvent selected from the group consisting of N-methyl-2-pyrrolidone (NMP), which is preferred, N-ethyl-2-pyrrolidone (NEP), N-octyl-2-pyrrolildone (NOP), dimethyl acetamide, dimethyl formamide (DMF), dimethyl sulfoxide (DMSO) and gamma-butyrolactone (GBL).

In yet another aspect of the present invention, the polymer solution used to prepare the membrane of the invention comprises in addition to the particles contained in the doped membrane from 12 to 15 wt.-% polyethersulfone or polysulfone as hydrophobic polymer and from 5 to 10 wt.-% PVP, wherein said PVP consists of a low and a high molecular PVP component. The total PVP contained in the spinning solution consists of from 22 to 34 wt.-%, preferably of from 25 to 30 wt.-%, of a high molecular weight (>100 kDa) component and from 66 to 78 wt.-%, preferably from 70 to 75 wt.-% of a low molecular weight (<=100 kDa) component. Examples for high and low molecular weight PVP are, for example, PVP K85/K90 and PVP K30, respectively. The polymer solution used in the process of the present invention preferably further comprises from 66 to 86 wt.-% of solvent and from 1 to 5 wt.-% suitable additives. Suitable additives are, for example, water, glycerol and/or other alcohols. Water is especially preferred and, when used, is present in the spinning solution in an amount of from 1 to 8 wt.-%, preferably from 2 to 5 wt.-%. The solvent used in the process of the present invention preferably is chosen from N-methylpyrrolidone (NMP), dimethyl acetamide (DMAC), dimethyl sulfoxide (DMSO), dimethyl formamide (DMF), butyrolactone and mixtures of said solvents. NMP is especially preferred. The center fluid or bore liquid which is used for preparing the membrane comprises at least one of the above-mentioned solvents and a precipitation medium chosen from water, glycerol and other alcohols. Most preferably, the center fluid consists of 45 to 70 wt.-% precipitation medium and 30 to 55 wt.-% of solvent. Preferably, the center fluid consists of 51 to 57 wt.-% of water and 43 to 49 wt.-% of NMP. Methods for preparing such membranes are disclosed in detail in European Patent Application No. 08008229, incorporated herein by reference.

According to yet another aspect of the present invention, the doped membranes of the invention are so called protein separation membranes, sometimes also referred to as "plasma purification or "plasma fractionation membrane". Such membrane is characterized by allowing the passage of ≥90% of molecules having a molecular weight of below 100 kD, while molecules having a molecular weight of >1000 kD will pass the membrane wall only to a very limited extend (≤10%). The membrane thus allows to separate plasma in fractions with mainly larger proteins/lipids and smaller proteins, such as, for example, albumin. Membranes of this type are known and also commercially available, for example the "Monet®" filter (Fresenius Medical Care Deutschland GmbH).

According to one aspect of the present invention, the membranes have hollow fiber geometry. According to another aspect of the present invention, the membranes have flat sheet geometry.

It is another object of the present invention to provide a method for preparing the membrane of the invention in hollow fiber geometry, wherein the method comprises (a) grinding the particles to an average size of up to 15 μm in an aqueous solution which optionally also comprises PVP and/or an organic solvent; (b) optionally further suspending the grinded particles in an organic solvent; (c) combining the at least one hydrophilic and the at least one hydrophobic polymer with the suspension of step (a) or (b); (d) stirring the polymer particle suspension to obtain a polymer solution wherein the particles are suspended; (e) degassing the polymer particle suspension; (f) extruding the polymer solution together with the suspended particles through an outer ring slit of a nozzle with two concentric openings, wherein a center fluid is extruded through the inner opening of the nozzle; (g) optionally exposing the polymer solution on the outside of the precipitating fiber to a humid steam/air mixture comprising a solvent in a content of between 0 and 10% by weight related to the water content; (h) immersing the precipitating fiber in a bath of non-solvent; (i) washing and optionally drying and sterilizing the membrane.

It is another object of the present invention to provide a method for preparing the membrane of the invention in flat sheet geometry, wherein the method comprises (a) grinding the particles to an average size of up to 15 μm in an aqueous solution, optionally in the presence of PVP and/or an organic solvent; (b) optionally further suspending the particle solution in organic solvent; (c) combining the at least one hydrophilic and the at least one hydrophobic polymer with the suspension of step (a) or (b); (d) stirring the polymer particle suspension to obtain a polymer solution wherein the particles are suspended; (e) degassing the polymer particle suspension; (f) casting the polymer solution together with the suspended particles as an uniform film onto a smooth surface; (g) washing the membrane and optionally drying and/or sterilizing the membrane.

In yet another aspect of the present invention, it is of course possible to create hollow fiber membranes based on the present invention, wherein the membranes have multiple layers which are concentrically arranged and wherein at least one of the layers comprises 5-40 wt.-% of particles having an average particles size of below 15 μm entrapped in the membrane according to the invention. The layer adjacent to the layer containing ion exchange and/or carbon particles is preferably the one which contacts the blood in applications which involve the treatment of blood or blood components, e.g. in an extracorporeal system. Like that, the risk of any particles being washed out of the membrane is minimized. It is also possible to have adjacent layers to the outer and inner surface of the particle containing layer. The multi layer membranes can be produced in analogy to what is disclosed in WO 2006/019293 A1, which is incorporated herein by reference.

EXAMPLES

Example 1

Grinding of Ion Exchange Resin in the Presence and Absence of Water

Figure 4A:
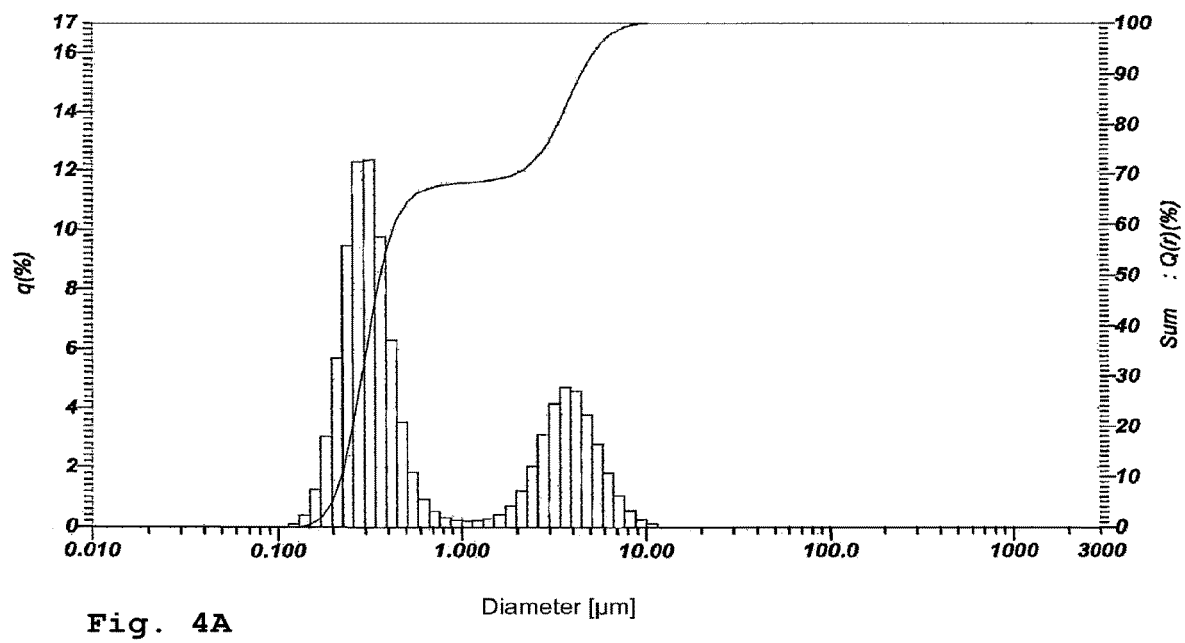
FIG. 4 shows the average size (diameter in μm) of two exemplary batches of cholestyramine particles after grinding in aqueous solution in the presence of an organic solvent in a LabStar LS 1 LMZ machine with $ZrO_2$ as agitator grinding medium and a temperature of 50° C. (see Ex. 1). The data are shown as provided by the Horiba LA950 for Windows Version 3.40 software. The particles of FIG. 4A were obtained after 60 minutes of grinding; the particles of FIG. 4B were obtained after 120 minutes of grinding.
Figure 4B:
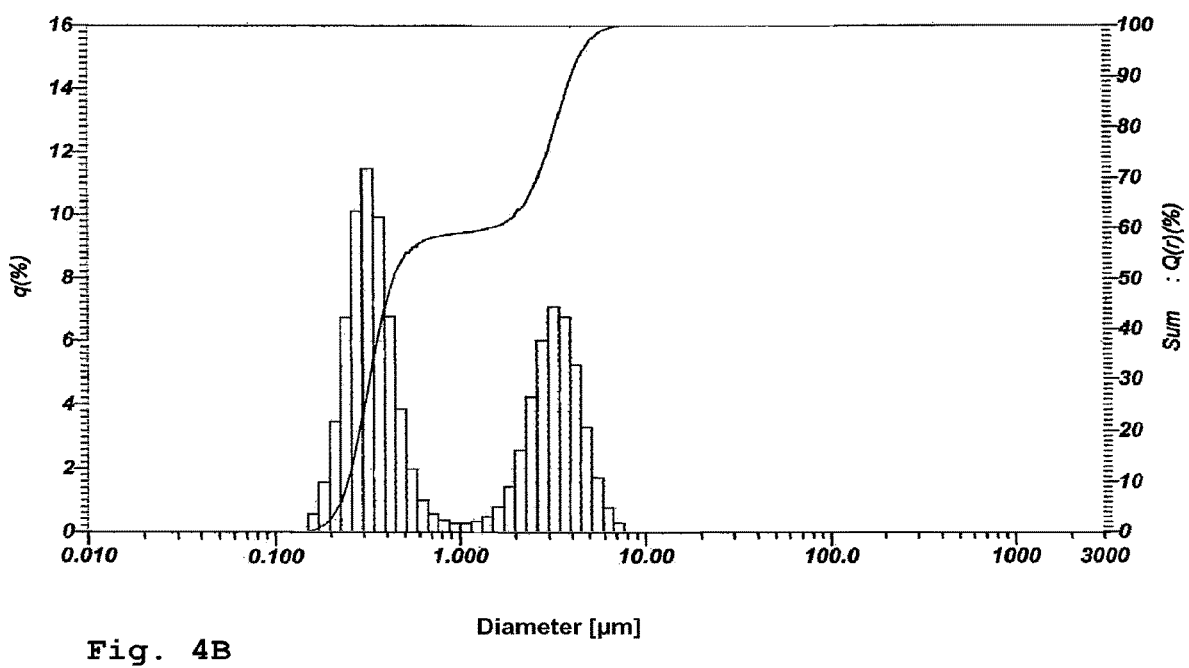

Grinding was performed with a LabStar LS1 grinding mill of Netzsch. Dowex® 1×2 anion exchanger was grinded in two separate batches A and B in the presence of water and NMP as an organic solvent (see also FIGS. 4A and 4B, corresponding to Batch B and Batch A, respectively). Batch C was grinded in the absence of water. Table I summarizes the settings for the grinding procedure.

TABLE I

|  | Batch A (RF070205A) | Batch B (RF070207A) | Batch C (RF061106A) |
| --- | --- | --- | --- |
| Ion exchange material | Dowex ® 1×2-Cl, 1000 g | Dowex ® 1×2-Cl, 500 g | Dowex ® 1×2-CL, 500 g |
| Solvent | Water/NMP (247.1 g/1300 g) | Water/NMP (247.1 g/1300 g) | NMP (2000 g) |
| Agitator speed | 3000 l/min | 3000 l/min | 3000 l/min |
| Throughput | 74 kg/h | 76 kg/h | 60 kg/h |
| Energy input | 3.99 kWh | 1.81 kWh | 7.96 kWh |
| Grinding material | Zirconium oxide | Zirconium oxide | Zirconium Oxide |
| Filler Loading | 90% | 90% | 90% |
| Treatment time | 120 min | 60 min | 300 min |
| Particle diameter on cumulative % | d99 = 7.6 μm | d99 = 5.9 μm | d99 = 8.0 μm |

The process data were collected for controlling energy input, pump speed and the resulting average size of the grinded particles. FIG. 4 shows the results for the above batches of Table I. As can be seen, Batch A resulted in particles with q99%:7.6 μm. Batch B resulted in particles with q99%:5.9 μm. A considerable portion of the particles in Batches A and B, in the presence of water, have a diameter of well below 1 μm.

Figure 5:
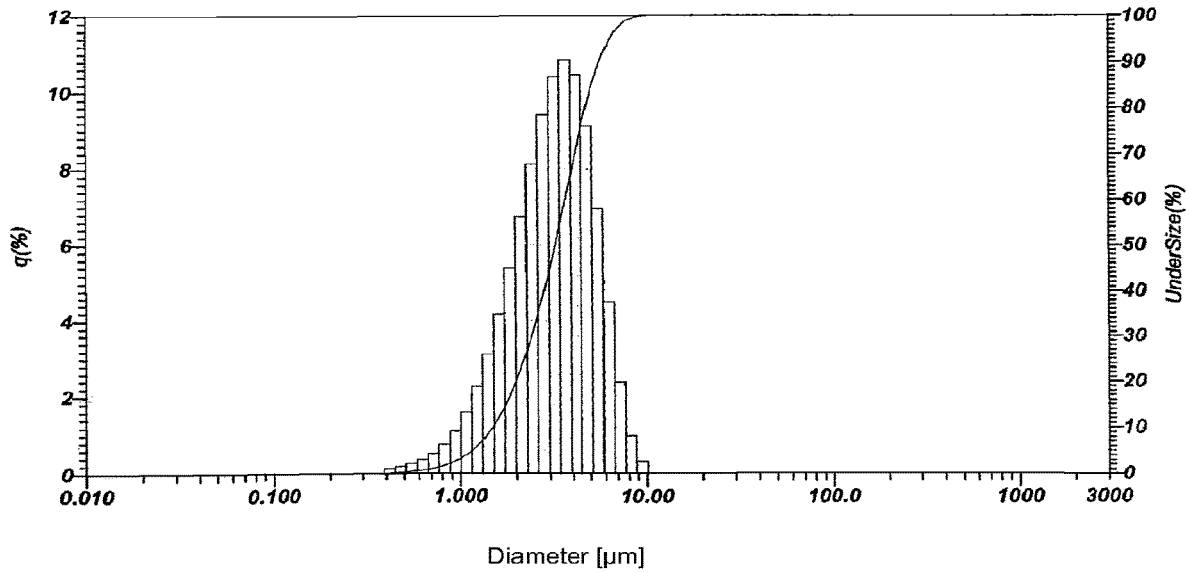
FIG. 5 shows the average size (diameter in μm) of another exemplary batch of cholestyramine particles after 300 minutes of grinding in the presence of an organic solvent (NMP) in a LabStar LS 1 LMZ machine with $ZrO_2$ as agitator grinding medium and a temperature of 50° C. The data are shown as provided by the Horiba LA950 for Windows Version 3.40 software. The average diameter was about 8.0 μm.
Figure 6:
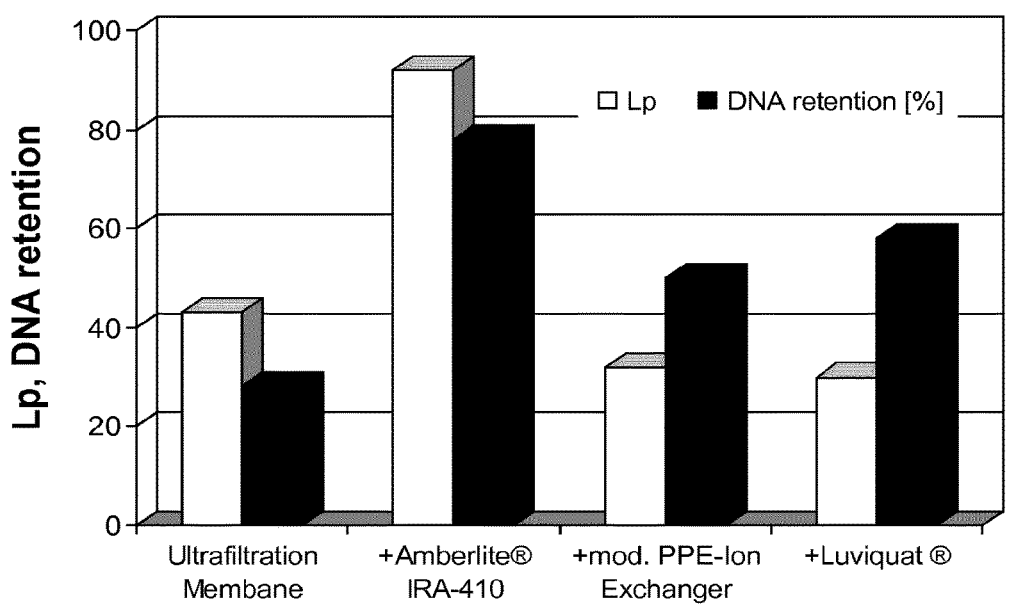
FIG. 6 shows Lp and DNA retention capability of different membranes of hollow fiber and flat sheet geometry. For comparative reasons, a standard ultrafiltration membrane without any added material was tested (see also Example 6). Also shown is a hollow fiber membrane with entrapped Amberlite® IRA-410 particles and a hollow fiber membrane with modified PPE ion-exchanger additive (Example 7). A flat sheet membrane was also tested. It contained Luviquat® FC 370 (Example 5). DNA retention is improved in the presence of ion exchange material in membranes which have been prepared according to the invention.
Figure 7:
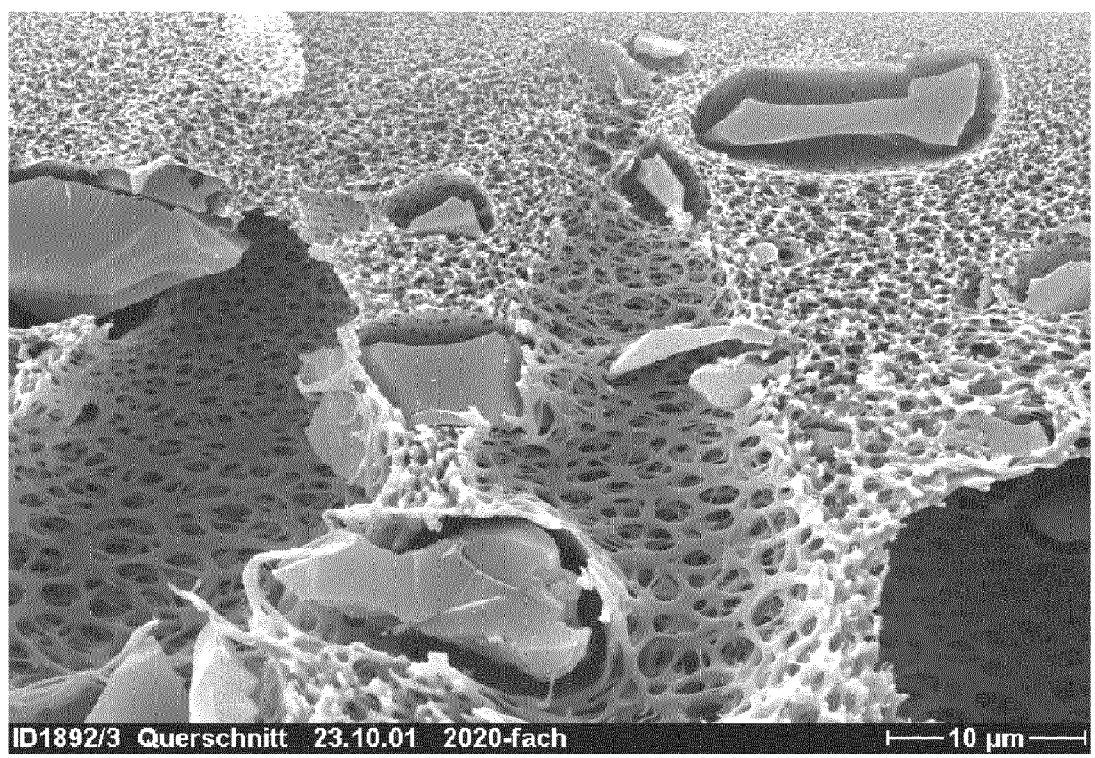
FIG. 7 shows a SEM of a comparative flat sheet membrane containing Amberlite® IRA-410 particles. The membrane was prepared according to Example 6 and is shown at a magnification of 2020. Larger particles are clearly visible in the membrane structure, as are ruptures on the surface of the pores of the membrane.

Comparative Batch C (see also FIG. 5) resulted in particles with g99%:8.0 μm, which per se was a satisfying result with regard to the goal of having particles of at least below 15 μm. However, the resulting particles of Batches A and B were already swollen. The particles of Batch C, however, had not yet been contacted with the water present in the spinning solution (see Example 2.2).

Example 2

2.1 Preparation of a Spinning Solution which Contains Particles Grinded in the Presence of Water The particles of Batch A (see Example 1) were used for the preparation of a spinning solution for preparing a microporous doped membrane. The polymer composition was chosen to be a combination of hydrophobic polyethersulfone (PES) and a mixture of polyvinylpyrrolidone having high molecular weight (PVP K85) and low molecular weight (PVP K30). The spinning solution further comprised NMP as a solvent and water.

Batch A (2414.48 g) was comprised, after grinding, of anion exchange particles (19.88%), NMP (65.21%) and $H_2O$ (14.91%). This suspension was filled into a glass reactor and 1362.97 g NMP were added. The suspension was stirred at U=600 $min^{-1}$ until the suspension was homogenous. This was followed by a one hour treatment, under stirring, with an ultrasonic device of Hielscher (UP 400S) for the homogenization and deagglomeration of the suspension. The UP 400S was set to Cycle 1, Amplitude 45% and an energy input of 150 W.

PVP K85 (180 g) was then added to the suspension and the stirrer was set to 1000 $min^{-1}$. The PVP K85 was dissolved under stirring and ultrasound for one hour. 360 g PVP K30 were then added and also dissolved under stirring and ultrasound. 960 g PES were then added and after 15 minutes the ultrasound device was removed. The stirring velocity was adapted to the apparent viscosity of the suspension. After the PES had completely been solved the average particle size was determined in a particle counter. To this end, 100 μl of the solution were taken and added to 600 ml NMP in a glass bottle. The sample was stirred for about 15 to 20 minutes. The particle counter was set as follows. Channel setting: 16/2-100 μm, sample volume; 5 ml; flow rate: 60 ml/min; number of runs: 9; dilution factor: 1.0; discard first run. No particles larger than about 15 μm could be detected in the spinning solution.

The spinning solution ready for spinning was comprised of (wt.-%) grinded Dowex® 1×2 anion exchanger: 8%; NMP: 61%; PVP K85: 3%; PVP K30: 6%; PES: 16%; $H_2O$: 6%.

The spinning solution comprising the particles of Batch B was prepared accordingly. Batch (1622.9 g) B contained, after grinding, grinded Dowex® 1×2 particles (17.75%, NMP: 68.87% and water (13.35%). NMP (1083.82 g) was added to the suspension which was treated as described above for Batch A and PVP K85 (108.27 g), PVP K30 (216.54 g) and PES (577.44 g) were added. No particles larger than about 15 μm could be detected in the spinning solution. The spinning solution ready for spinning was comprised of (wt.-%) grinded Dowex® 1×2 anion exchanger: 8%; NMP: 61%; PVP K85: 3%; PVP K30: 6%; PES: 16%; $H_2O$: 6%.

2.2 Preparation of a Comparative Spinning Solution which Contains Particles Grinded in the Presence of Organic Solvent The anion exchanger particle suspension of Example 2 (Batch C) after grinding contained NMP (222.07) and 25 wt.-% of the anion exchange particles (191.92 g). The suspension was treated with ultrasound as described in Example 2.1 for 1 h. Several batches were treated (separately) in order to guarantee an optimal homogenization and deagglomeration. The treated suspensions were then transferred to a three-necked flask. The final content of NMP in the flask was set to a total of 1830 g NMP (61 wt.-% of the final polymer solution) and 239.9 g of the anion exchange material (8% of the final polymer solution). PVP K85 (90 g) was slowly added to the solution (3% of the final polymer solution), followed by the careful addition of 180 g PVP K30 (6% of the final polymer solution). Ultrasound treatment was applied until the PVP components had completely dissolved. Then PES (480 g) was added slowly (16% of the final polymer solution) at a temperature of 45° C. Finally, $H_2O$ (180 g) was carefully added (6% of the final polymer solution).

The control of the particle size after each step gave the following results: (1) after mixing particles and NMP: d99=20 µm; (2) after addition of PVP K85: d99=30 µm; (3) after addition of PVP K30: d99=30 µm; (4) after addition of PES: d99=25 µm; (5) after complete addition of water: d99=30 µm. The polymer solution was then used for spinning.

Example 3

Preparation of Doped Hollow Fiber Membranes

Spinning of hollow fibers was done as described in the art for all polymer solutions of Example 2. The polymer and solvent components used for the various membranes are set forth again in Table II, wherein samples 2-3a were prepared with the spinning solution containing Batch A particles (Ex. 1 and 2.1) and samples 4-5 were prepared with the spinning solution containing Batch B particles (Ex. 1 and 2.1). Sample 1 was prepared from a spinning solution according to Ex. 2.2 comprising particles as described in Ex. 1 (Batch C). Table II also shows the composition of the center fluid which was used for the spinning process.

TABLE II

| | Polymer solution | | | | | | | Center | |
|---|---|---|---|---|---|---|---|---|---|
| Samples | PES % | PVP K85 % | PVP K30 % | DOWEX 1×2 % | $H_2O$ % | NMP % | Viscosity CP | $H_2O$ | NMP |
| 1 | 16 | 3 | 6 | 8 | 6 | 61 | ~200000 | 22 | 78 |
| 2-3a | | | | | | | 110000 | | |
| 4-5 | | | | | | | 112200 | | |

For the spinning process, the respective polymer solutions of Example 2 were transferred into stable stainless steel containers. The containers were closed and vacuum was applied for degassing the solutions. The solution was degassed and then heated to 50° C. and passed through a spinning die (1200×440×220 µm) into the precipitation bath. As center fluid, a mixture of 22% $H_2O$ and 78% NMP was used (Table II). The temperature of the die (SD) and of the spinning shaft (SS) can be derived from Table III. The hollow fiber membrane was formed at a spinning speed of between 13.0 and 13.2 m/min (see Table III). The liquid fiber leaving the die was passed into a heated precipitation (water) bath having a temperature of about 65° C. (see Table III). The fiber, at leaving the die, was surrounded by water vapor from the precipitation bath. The distance between the exit of the die and the precipitation bath was 7 to cm (see Table III). The precipitated fiber was guided through several water baths and subjected to online-drying followed by undulation of the fiber. The fibers were transferred into bundles.

The resulting hollow fiber membranes had an inner diameter of between 375 and 388 µm and a wall thickness of between 116 and 122 µm (see Table IV).

TABLE III

| | Spinning Parameters | | | | | |
|---|---|---|---|---|---|---|
| | | Distance to Water | Precipitation Bath | | Temperature | |
| Sample | Spinning Speed [m/min] | Bath [cm] | T [° C.] | NMP [%] | Spinning Nozzle | Spinning Shaft |
| 1 | 13 | 8[1] | 55 | 0 | 50 | 50 |
| 2 | 13 | 8[1] | ca. 65 | 0 | 46 | 52-54 |
| 3 | 13.2 | 7[2] | ca. 65 | 0 | 47 | 54 |
| 3a | 13.2 | 7[2] | ca. 64 | 0 | 46 | 53 |
| 4 | 13.2 | 7[2] | ca. 65 | 0 | 47 | 54 |
| 5 | 13.2 | 7[2] | ca. 65 | 0 | 48 | 54 |

[1]Spinning shaft with 1 cm distance to water surface.
[2]Spinning shaft directly on water surface.

TABLE IV

| | Dimensions | |
|---|---|---|
| Sample | Inner diameter µm | Wall thickness µm |
| 1 | 380 | 120 |
| 2 | 385 | 118 |
| 3 | 383 | 116 |
| 3a | 380 | 115 |
| 4 | 375 | 122 |
| 5 | 388 | 118 |

Example 4

Preparation of Hollow Fiber Membranes Doped with Amberlite® IRA 410 or PEI, Dowex® 1×2 Anion Exchanger Plus Carbon Particles Doped microporous hollow fiber membranes were prepared according to Example 3, wherein polyethyleneimine (PEI, see Samples 1-12, 14-16 in Table Va) and both grinded Dowex® 1×2 anion exchange particles and highly conductive carbon black particles Printex® XE2 (Degussa AG), see Samples 13, 17-24 in Table V, were entrapped in the membrane. The preparation of the spinning solution was done as described before in Example 2.1. The polymer composition was as set forth in Table V. Table VI summarizes the spinning parameters which were applied for the production of this double-doped membrane. Samples 1-16 were online dried and subjected to an undulation of the fibers. For Samples 1-16 standard 500×350×170 µm were used. For the rest, 1200×440×220 µm spinning nozzles were used.

TABLE V

| | Polymer Solution | | | | | | | | Center | |
|---|---|---|---|---|---|---|---|---|---|---|
| Sample | PAES % | PVP K85 % | PVP K30 % | DOW-EX® 1 × 2 % | PRIN-TEX® XE2 | $H_2O$ % | NMP % | PEI % | $H_2O$ % | NMP % |
| 1 | 17.75 | 3 | 8 | 0 | 0 | 0.96 | 69.99 | 0.3 | 46 | 54 |
| 2 | 17.75 | 3 | 8 | 0 | 0 | 0.96 | 69.99 | 0.3 | 44 | 56 |
| 3 | 17.75 | 3 | 8 | 0 | 0 | 0.96 | 69.99 | 0.3 | 42 | 58 |
| 4 | 17.75 | 3 | 8 | 0 | 0 | 0.96 | 69.99 | 0.3 | 40 | 60 |
| 5-12, 14-16 | 17.75 | 3 | 8 | 0 | 0 | 0.96 | 69.99 | 0.3 | 38.5 | 61.5 |
| 13, 17-19 | 17 | 3.25 | 7 | 4 | 0 | 6 | 62.75 | 0 | 22 | 78 |
| 20-22 | 16 | 3 | 6 | 8 | 0 | 6 | 61 | 0 | 22 | 78 |
| 23, 24 | 16 | 3 | 6 | 7 | 1 | 6 | 61 | 0 | 22 | 78 |

Figure 8:
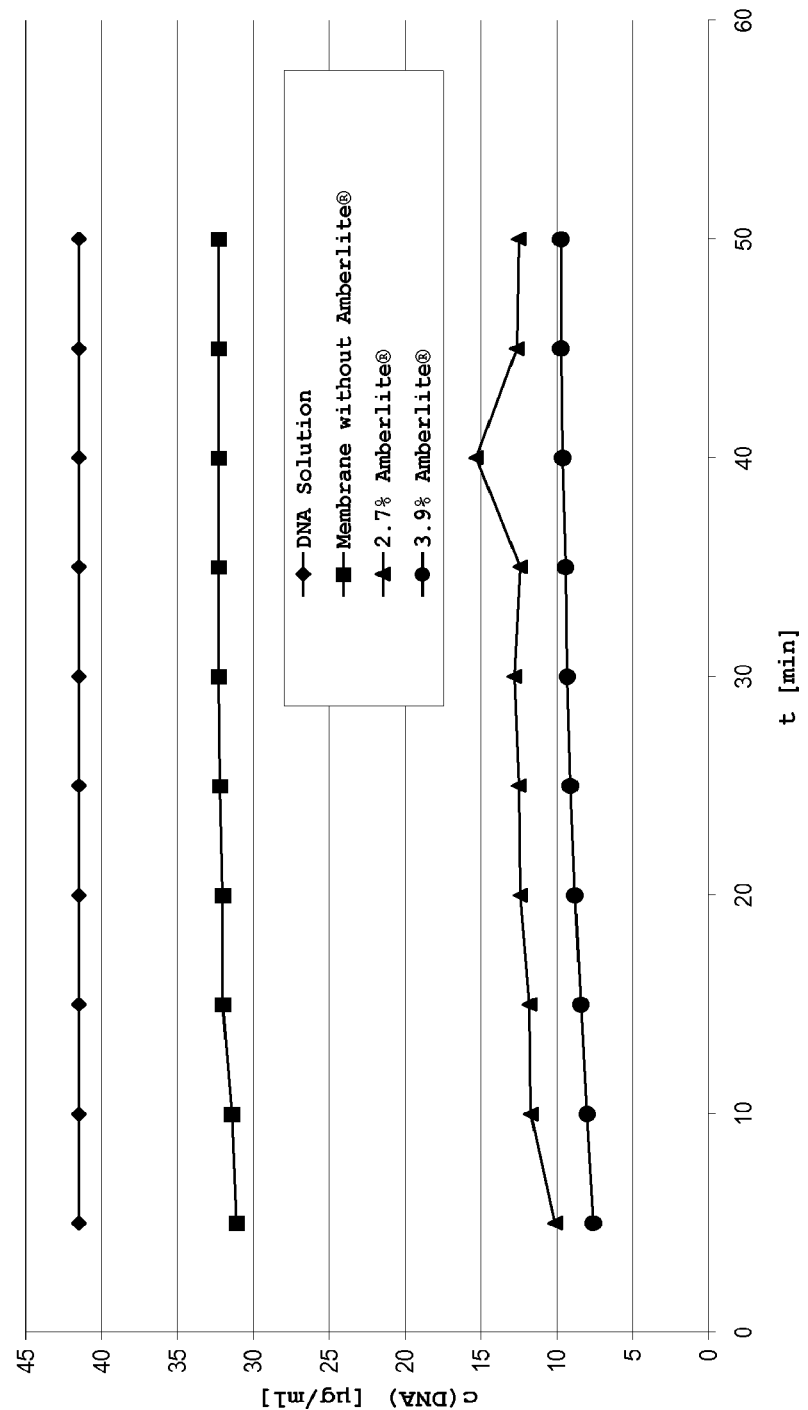
FIG. 8 shows the results of DNA retention (adsorption) tests done with mini-modules prepared from Amberlite® IRA410 containing membranes produced according to Example 4. The Figure shows the feed DNA solution and the DNA concentration in the filtrate for a standard membrane without Amberlite® IRA-410 (Table Vb, Samples 10-13) and with different concentrations of Amberlite® IRA-410 (Table Vb, Samples 3-5 and 6-8, respectively). The presence of Amberlite® IRA410 leads to a significant adsorption of the DNA, with a higher rate for membranes with a higher content of Amberlite® IRA-410.

Hollow fiber membranes which contained Amberlite® IRA-410 particles were prepared accordingly, based on the following polymer compositions (Table Vb). Samples 10-13 were prepared for comparative reasons without any Amberlite® IRA410 particles. Triple spinnerets were used for Samples 10-16. Other spinnerets used were a 600×305×170 μm spinneret for Samples 2 and 6-9, a 500×350×170 μm spinneret for Sample 1 and a 1200×440×220 for Samples 3-5. Spinning was done as summarized in Table VIb. Inner diameter and wall thickness are also shown in Table VIb. DNA retention capability (adsorption) was measured with salmon sperm DNA (c=40 μg/ml, dialysate, RT, Q=1.9 ml/min, t=50 min). The results are shown in FIG. 8 in comparison to a membrane without any entrapped Amberlite® IRA-410. It can be seen that the presence of the ion-exchanger leads to a clear reduction of the DNA concentration.

TABLE Vb

| | Polymer Solution | | | | | | Center | | |
|---|---|---|---|---|---|---|---|---|---|
| Sample | PES [%] | PVP K90 [%] | PVP K30 [%] | Amberlite® IRA-410 [%] | $H_2O$ [%] | NMP [%] | $H_2O$ [%] | PVP K90 [%] | NMP [%] |
| 1 | 13.1 | 1.9 | 4.8 | 3.9 | 2.9 | 73.4 | 56 | 0 | 44 |
| 2 | 13.5 | 1.5 | 5 | 1.3 | 3 | 75.7 | 56 | 0 | 44 |
| 3 | 13.3 | 1.5 | 4.9 | 2.7 | 2.9 | 74.7 | 56 | 0 | 44 |
| 4 | 13.3 | 1.5 | 4.9 | 2.7 | 2.9 | 74.7 | 56 | 0 | 44 |
| 5 | 13.3 | 1.5 | 4.9 | 2.7 | 2.9 | 74.7 | 56 | 0 | 44 |
| 6 | 13.1 | 1.5 | 4.8 | 3.9 | 2.9 | 73.8 | 56 | 0 | 44 |
| 7 | 13.1 | 1.5 | 4.8 | 3.9 | 2.9 | 73.8 | 56 | 0 | 44 |
| 8 | 13.1 | 1.5 | 4.8 | 3.9 | 2.9 | 73.8 | 56 | 0 | 44 |
| 9 | 17.1 | 2.9 | 6.6 | 5.1 | 0 | 68.3 | 43 | 0 | 57 |
| 10 | 13.6 | 2 | 5 | 0 | 3 | 76.4 | 56 | 0 | 44 |
| 11 | 13.6 | 2 | 5 | 0 | 3 | 76.4 | 56 | 0 | 44 |
| 12 | 13.6 | 2 | 5 | 0 | 3 | 76.4 | 56 | 0 | 44 |
| 13 | 13.6 | 2 | 5 | 0 | 3 | 76.4 | 56 | 0 | 44 |
| 14 | 13.6 | 2 | 5 | 1.36 | 3 | 75.04 | 56 | 0 | 44 |
| 15 | 13.6 | 2 | 5 | 1.36 | 3 | 75.04 | 56 | 0 | 44 |
| 16 | 13.6 | 2 | 5 | 1.36 | 3 | 75.04 | 56 | 0 | 44 |

TABLE VI

| | Spinning Conditions | | | | | |
|---|---|---|---|---|---|---|
| | | Precipitation bath | | | Temperature | |
| Sample | $v_{ab}$ [m/min] | Distance to water bath [cm] | T [°C.] | NMP [%] | SK °C. | SS °C. |
| 1 | 10 | 4 | 30 | 80 | 60 | — |
| 2 | 10 | 4 | 30 | 80 | 60 | — |
| 3 | 10 | 4 | 31 | 80 | 60 | — |
| 4 | 10 | 4 | 31 | 80 | 60 | — |
| 5 | 10 | 4 | 31 | 80 | 57 | — |
| 6 | 10 | 4 | 31 | 80 | 60 | — |
| 7 | 10 | 4 | 31 | 80 | 63 | — |
| 8 | 10 | 4 | 31 | 80 | 66 | — |
| 9 | 10 | 4 | 30 | 80 | 49 | — |
| 10 | 10 | 4 | 30 | 80 | 51 | — |
| 11 | 10 | 4 | 30 | 80 | 53 | — |
| 12 | 10 | 4 | 30 | 80 | 56 | — |
| 13 | 13 | 8[1] | 51 | 0 | 50 | ~46 |
| 14 | 10 | 4 | 30 | 80 | 55 | — |
| 15 | 10 | 4 | 30 | 80 | 57 | — |
| 16 | 10 | 4 | 30 | 80 | 59 | — |
| 17 | 13 | 8[1] | 51 | 0 | 50 | ~45 |
| 18 | 13 | 8[1] | 51 | 0 | 50 | ~45 |
| 19 | 13 | 8[1] | 51 | 0 | 50 | ~45 |
| 20 | 13 | 8[1] | 52 | 0 | 50 | ~46 |
| 21 | 13 | 8[1] | 57 | 0 | 50 | ~48 |
| 22 | 13 | 8[1] | 56 | 0 | 50 | ~48 |
| 23 | 13 | 8[1] | 51 | 0 | 50 | ~45 |
| 24 | 13 | 8[1] | 57 | 0 | 50 | ~49 |

[1]hot precipitation bath with 1 cm distance to the bath

The dimensions of the fibers with Dowex® 1×2 and Printex® XE2 particles are shown in Table VII. It was possible to reduce the wall thicknesses to about 50 μm for fibers with PEI and to about 70 to 80 μm for fibers with Dowex® 1×2 anion exchange particles and carbon black particles Printex® XE2.

TABLE VIb

| Sample | Distance to precip. bath [cm] | $v_{ab}$ [m/min] | Temperature Spinning Nozzle [° C.] | Temperature Spinning Shaft [° C.] | Dimensions Inner Diameter [μm] | Wall Thickness [μm] |
|---|---|---|---|---|---|---|
| 1 | 100 | 20 | 51 | 45 | nd | nd |
| 2 | 100 | 20 | 51 | 45 | 254 | 53 |
| 3 | 100 | 17 | 51 | 45 | 270 | 88 |
| 4 | 100 | 17 | 51 | 45 | 274 | 92 |
| 5 | 100 | 17 | 53 | 48 | 265 | 92 |
| 6 | 100 | 17 | 51 | 45 | 256 | 75 |
| 7 | 100 | 18 | 53 | 48 | 257 | 73 |
| 8 | 100 | 18 | 53 | 48 | 243 | 70 |
| 9 | 68 | 17 | 47 | 45 | 318 | 50 |
| 10 | 100 | 45 | 55 | 50 | 212 | 48 |
| 11 | 100 | 45 | 55 | 50 | 212 | 48 |
| 12 | 100 | 37 | 57 | 52 | 211 | 74 |
| 13 | 100 | 37 | 57 | 52 | 211 | 74 |
| 14 | 80 | 37 | 58 | 55 | 213 | 71 |
| 15 | 80 | 37 | 58 | 55 | 213 | 71 |
| 16 | 100 | 45 | 55 | 50 | 211 | 53 |

TABLE VII

| Sample | Dimensions Inner diameter μm | Wall thickness μm |
|---|---|---|
| 1 | 214 | 50 |
| 2 | 218 | 50 |
| 3 | 213 | 50 |
| 4 | 216 | 51 |
| 5 | 215 | 51 |
| 6 | 218 | 52 |
| 7 | 215 | 48 |
| 8 | 218 | 50 |
| 9 | 217 | 51 |
| 10 | 217 | 52 |
| 11 | 215 | 51 |
| 12 | 213 | 51 |
| 13 | 320 | 50 |
| 14 | 219 | 50 |
| 15 | 213 | 52 |
| 16 | 215 | 50 |
| 17 | 321 | 50 |
| 18 | 323 | 79 |
| 19 | 321 | 50 |
| 20 | 318 | 77 |
| 21 | 317 | 78 |
| 22 | 258 | 80 |
| 23 | 321 | 78 |
| 24 | 326 | 77 |

Example 5

Preparation of Flat Sheet Membranes Containing Luviquat® FC 370 Particles

Doped flat sheet membranes containing Luviquat® FC 370 (BASF AG) particles (poly[(3-methyl-1-vinylimidazolium chloride)-co-(1-vinylpyrrolidone)] polyquaternium), were prepared. The polymer solution contained 13.6 wt.-% PEAS, 2.0 wt.-% PVP K90, 5.0 wt.-% PVP K30 and 79.4 wt.-% NMP. All components were dissolved in NMP and stirred at 60° C. The suspension was additionally filtered (50 μm). The precipitation solution, having a temperature of 50° C., contained 56 wt.-% water and 44 wt.-% NMP. The final polymer solution was cast as uniform film onto a smooth surface (glass slide) which acted as supporting area by utilizing a special coating knife. First, the polymer solution at 60° C. was directly applied steady-going onto the glass slide using a syringe. The coating knife was driven with a constant velocity, thus creating a uniform polymer film. This glass slide with the thin polymer film was quickly dipped into the precipitation bath. Subsequently, the precipitated membrane was taken out, stored in non-solvent until all membranes of a series were prepared and then cut into a defined size. After cutting, the membranes were washed with distilled water, dried and finally packed in special bags used for sterilization.

Example 6

Preparation of Flat Sheet Membranes Doped with Amberlite® IRA-410 (Comparative Example)

Doped flat sheet membranes were prepared according to Example 5, wherein Amberlite® IRA-410 (chloride form) particles were entrapped in the membrane at different concentrations (0%, 30% and 50%). The Amberlite® particles were suspended in water and grinded and the material was passed through a PE net (50 μm and 20 μm) in order to remove particles with a size of above 20 μm. The excess water was then removed in a vacuum rotary evaporator and NMP was added, followed by another treatment with the vacuum rotary evaporator for the removal of remaining water. The other components of the polymer solution were then added to the NMP suspension (see Table VIII). An agglutination of the particles was visible at that stage already.

Example 7

Preparation of Membranes Doped with Modified poly(p-phenylene ether) (PPE)

Doped microporous hollow fiber membranes were prepared according to Example 3, wherein modified PPE was added to the membrane as anion-exchanger. The modified PPE (FUMA-Tech GmbH, St. Ingbert, 5 or 15% solution) was produced by bromination of PPE, dissolving it in NMP and reacting it with N-methylimidazole. The resulting structure is as follows:

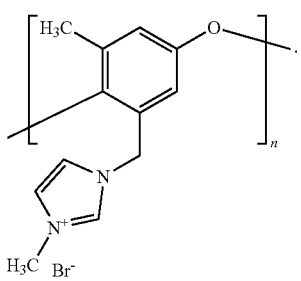

The polymer composition was as set forth in Tables VIII. Table VIII(a) shows the composition for preparing an ultrafiltration membrane with (a1-a3) and without (a4) anion exchange component. The resulting membrane was prepared as shown in Table VIII (b). The inner diameter was about 213-217 μm and the wall thickness about 48-50 μm. Then, the DNA retention was compared (Table VIII(c)) with the help of mini-modules. Again, salmon sperm DNA (40 mg/l) was used, dead end filtration at 2 ml/min, t=100 min. The retention of DNA could be improved by the anion exchanger.

TABLE VIII(a)

| | Polymer | | | | | | Center | | |
|---|---|---|---|---|---|---|---|---|---|
| Sample | PAES % | mod. PPE % | PVP K90 % | PVP K30 % | H₂0 % | NMP % | H₂0 % | PVP K30 % | NMP % |
| a1 | 13.72 | 0.28 | 2 | 5 | 2 | 77.0 | 56 | 1 | 43 |
| a2 | 13.72 | 0.28 | 2 | 5 | 2 | 77.0 | 55 | 1 | 44 |
| a3 | 13.72 | 0.28 | 2 | 5 | 2 | 77.0 | 54 | 1 | 45 |
| a4* | 13.55 | 0 | 2 | 5 | 3 | 76.4 | 56 | 1 | 43 |

*with 0.05% polyamide

TABLE VIII (b)

| Sample | $v_{ab}$ [m/min] | Distance to water bath [cm] | Temperature Spinning Nozzle | Temperature Spinning Shaft |
|---|---|---|---|---|
| a1 | 45 | 100 | 55 | 50 |
| a2 | 45 | 100 | 58 | 53 |
| a3 | 45 | 100 | 58 | 53 |
| a4 | 45 | 100 | 54.5 | 48.5 |

TABLE VIII (c)

| Sample | DNA-Adsorption [%] |
|---|---|
| a1 | 50 |
| a4 | 28 |

Table VIII (d) shows the composition for preparing a microporous membrane with modified PPE(Table VIII(e)). The inner diameters were 258 and 259 μm for b1 and b2, respectively, with a wall thickness of 40 and 42 μm. The DNA retention was again assessed (Table VIII(f)) with mini-modules as described before and compared with the ultrafiltration membrane a4 which was prepared as described before in Tables VIII(a) and (b). Again, the DNA retention capability was clearly improved.

TABLE VIII(d)

| | Polymer | | | | | | Center | | |
|---|---|---|---|---|---|---|---|---|---|
| Sample | PAES % | mod. PPE % | PVP K90 % | PVP K30 % | H₂0 % | NMP % | H₂0 % | PVP K30 % | NMP % |
| b1 | 16.7 | 1.3 | 3.25 | 8 | 0 | 70.75 | 43 | 0 | 57 |
| b2 | 16.7 | 1.3 | 3.25 | 8 | 0 | 70.75 | 43 | 0 | 57 |

TABLE VIII (e)

| Sample | $v_{ab}$ [m/min] | Distance to water bath [cm] | Temperature Spinning Nozzle | Temperature Spinning Shaft |
|---|---|---|---|---|
| b1 | 28 | 60 | 45 | 43 |
| b2 | 28 | 60 | 47 | 45 |

TABLE VIII (f)

| Sample | DNA-Adsorption [%] |
|---|---|
| b2 | 73 |
| a4 | 30 |

Example 8

Preparation of Hand Bundles and Mini-Modules

The preparation of a membrane bundle after the spinning process is necessary to prepare the fiber bundle for following performance tests. The first process step is to cut the fiber bundles to a defined length of 23 cm. The next process step consists of melting the ends of the fibers. An optical control ensures that all fibers are well melted. Then, the ends of the fiber bundle are transferred into a potting cap. The potting cap is fixed mechanically and a potting tube is put over the potting caps. Then the fibers are potted with polyurethane. After the polyurethane has hardened, the potted membrane bundle is cut to a defined length and stored dry before it is used for the different performance tests.

Mini-modules [=fiber bundles in a housing] are prepared in a similar manner. The mini-modules ensure protection of the fibers and are used for steam-sterilization. The manufacturing of the mini-modules comprises the following specific steps:

(A) The number of fibers required is calculated for an effective surface A of 360 cm² according to equation (1)

$$A = \pi \times d_i \times l \times n [\text{cm}^2] \tag{1}$$

Wherein $d_i$ is the inner diameter of fiber [cm], n represents the amount of fibers, and l represents the effective fiber length [cm].

(B) The fiber bundle is cut to a defined length of 20 cm.
(C) The fiber bundle is transferred into the housing before the melting process The mini-module is put into a vacuum drying oven over night before the potting process.

Example 9

Determining the Liquid Permeability (Lp) of a Membrane

The permeability was determined with either a hand bundle as described in Example 8 or with flat sheet membranes. For determining the Lp of a given hand bundle, said hand bundle is sealed at one end and a defined amount of water passes through the bundle under a certain pressure. This process will take a certain time. Based on said time, the membrane surface area, the pressure used and the volume of the water which has passed the membrane, the Lp can be calculated. The equation used is $$Lp = \frac{V}{p \times A \times t} = \frac{V}{\pi \times d \times l \times n \times p \times t}$$

wherein Lp is the convective permeability [·10$^{-4}$ cm/bar·s], V is the water volume [cm$^3$], p is the pressure [bar], t is the time, and A is the effective membrane surface of the bundle with A=π·d·l·n. The pressure used was 400 mmHg.

For determining the Lp of a flat sheet membrane, a water bath and test solution (water, dest.) is heated to 37° C. The membrane (A=27.5 cm$^2$) is soaked in the test solution for at least 30 minutes. The soaked membrane is inserted into the measuring device. A maximum pressure of 600 mmHg (0.8 bar) is applied. The time needed for the passage of 1 ml water is determined. The equation used is $$Lp = \frac{V(\text{ml}) \times 750}{A(\text{cm}^2) \times p(\text{mmHg}) \times t(s)}.$$

The invention claimed is:

1. A hollow fiber membrane for removal of compounds from blood or blood plasma in an extracorporeal system, the membrane comprising i) at least one hydrophobic polymer selected from the group consisting of polysulfones, polyethersulfones, polyarylethersulfones, polyamides and polyacrylonitriles comprising 80-99% by weight of total polymer ii) polyvinylpyrrolidone comprising 1-20% by weight of the total polymer, and iii) 20-40 wt. % particles comprising a) hydrophilic particles, b) hydrophobic particles, or c) a combination of both, wherein the particles have an average diameter of between 0.1 μm and 15 μm,
wherein about 10-45% of the polyvinylpyrrolidone comprises a high molecular component polyvinylpyrrolidone and about 55-90% of the polyvinylpyrrolidone comprises a low molecular component polyvinylpyrrolidone,
wherein the membrane is prepared from a polymer solution comprising 1-10 wt. % of the particles, 10-26 wt. % of the hydrophobic polymer, and 8-15 wt. % polyvinylpyrrolidone, and
wherein the membrane removes the compounds from the blood or the blood plasma by adsorption or isolation.

2. The membrane according to claim 1, wherein the membrane comprises 35-40 wt.-% of the particles.

3. The membrane according to claim 1, wherein the hydrophobic particles are chosen from the group consisting of activated carbon, carbon nanotubes, hydrophobic silica, styrenic polymers, polydivinylbenzene polymers and styrene-divinylbenzene copolymers.

4. The membrane according to claim 1, wherein the hydrophilic particles are anion exchange particles.

5. The membrane according to claim 1, wherein the hydrophilic particles are cation exchange particles.

6. The membrane according to claim 4, wherein the anion exchange particles are based on polyquaternary ammonium functionalized styrene divinylbenzene copolymers.

7. The membrane according to claim 6, wherein the anion exchange particles are further based on polyquaternary ammonium functionalized vinylimidazolium methochloride vinylpyrrolidone copolymers.

8. The membrane according to claim 6, wherein the polyquaternary ammonium functionalized styrene divinylbenzene_copolymer are a copolymer of styrene and divinylbenzene with dimethyl (2-hydroxyethyl) ammonium and/or trimethylbenzyl ammonium functional groups.

9. The membrane according to claim 1, wherein the particles are modified Poly(p-phenylene ether) (PPE) particles.

10. A method for the removal of the compounds from the blood or the blood plasma in the extracorporeal system, said method comprising the step of contacting the blood or the blood plasma comprising the compounds to the membrane of claim 1, wherein the compounds are adsorbed or isolated from the blood or the blood plasma to the membrane.

11. The method of claim 10, wherein the compounds are selected from the group consisting of nucleic acids, unconjugated bilirubin, chenodeoxycholic acid, diazepam, cytokines and endotoxins.

12. The method of claim 10, wherein the compounds are DNA.

13. The method of claim 10, wherein the hydrophobic particles are chosen from the group consisting of activated carbon, carbon nanotubes, hydrophobic silica, styrenic polymers, polydivinylbenzene polymers and styrene-divinylbenzene copolymers.

14. The method of claim 10, wherein the hydrophilic particles are anion exchange particles or cation exchange particles.

15. The method of claim 14, wherein the hydrophilic particles are anion exchange particles, and wherein the anion exchange particles are based on polyquaternary ammonium functionalized styrene divinylbenzene copolymers.

16. The method of claim 14, wherein the hydrophilic particles are anion exchange particles, and wherein the anion exchange particles are based on polyquaternary ammonium functionalized vinylimidazolium methochloride vinylpyrrolidone copolymers.

17. The method of claim 15, wherein the polyquaternary ammonium functionalized styrene divinylbenzene copolymer is a copolymer of styrene and divinylbenzene with dimethyl (2-hydroxyethyl) ammonium and/or trimethylbenzyl ammonium functional groups.

18. The method of claim 10, wherein the particles are modified Poly(p-phenylene ether) (PPE) particles.

* * * * *